United States Patent [19]

Nakamura et al.

[11] Patent Number: 5,212,501
[45] Date of Patent: May 18, 1993

[54] IMAGE RECORDING APPARATUS WITH A LASER OPTICAL UNIT

[75] Inventors: Hiromu Nakamura; Akiyoshi Hamada; Satoru Ono, all of Toyokawa; Masanori Murakami; Toshio Naiki, both of Toyohashi; Kunihiko Omura, Toyokawa; Masahito Niikawa, Okazaki, all of Japan

[73] Assignee: Minolta Camera Kabushiki Kaisha, Osaka, Japan

[21] Appl. No.: 875,977

[22] Filed: Apr. 29, 1992

[30] Foreign Application Priority Data

Apr. 30, 1991 [JP] Japan ................................ 3-097815
Apr. 30, 1991 [JP] Japan ................................ 3-097818

[51] Int. Cl.$^5$ .................... G02B 26/10; H01S 3/18; G03G 15/04
[52] U.S. Cl. ..................................... 346/108; 359/641
[58] Field of Search ............... 346/108, 160; 359/641, 359/29, 31, 33, 34; 358/298, 300

[56] References Cited

U.S. PATENT DOCUMENTS 4,925,262  5/1990  Yamagishi et al. .

FOREIGN PATENT DOCUMENTS 6338272  8/1986  Japan .
3-78722  8/1989  Japan .
3-44086  2/1991  Japan .

OTHER PUBLICATIONS

Microcollicated Lazer Diode with Low Wavefront Aberration by S. Ogata et al. IEEE Photonics Technology Letters vol. 1, No. 11, Nov. 1989, pp. 354-355.

Primary Examiner—Joan H. Pendegrass
Attorney, Agent, or Firm—Price, Gess & Ubell

[57] ABSTRACT

An image recording apparatus wherein a laser diode which is disposed on a focal point of a micro Fresnel lens emits a laser beam and the laser beam is collimated by the Fresnel lens and scanned on a photosensitive drum by a polygonal mirror and an fθ optical system. A change in temperature of the laser diode does not result in such serious defocus as to cause practical problems.

19 Claims, 10 Drawing Sheets

IMAGE RECORDING APPARATUS WITH A LASER OPTICAL UNIT

BACKGROUND OF THE INVENTION

1. Field of the Invention

The present invention relates to an image recording apparatus, and more particularly to an image recording apparatus wherein a laser beam emitted from a laser diode writes an image on a recording medium.

2. Description of Related Art

Conventionally, in an electrophotographic laser printer, a laser beam optical scanning system has been using a laser diode as a light source. A laser beam emitted from the laser diode is a light diffused within a certain angle, and a convergent lens (a collimator lens) is disposed in front of the laser diode so as to change the diffused light into a parallel pencil of rays or a convergent pencil of rays.

Recently, a micro Fresnel lens has been developed. The micro Fresnel lens has a pattern of concentric circles pitched by microns on a sawtooth surface, and zones among the circles are alternatively transparent and opaque. The micro Fresnel lens uses refraction and diffraction. When a parallel pencil of rays enters the micro Fresnel lens, the rays are bent at the alternatively transparent and opaque zones, and the parallel pencil of rays are changed into a convergent pencil of rays. When the Fresnel lens receives a divergent pencil of rays emitted from its focal point, the Fresnel lens changes the divergent pencil of rays into a parallel pencil of rays.

The micro Fresnel lens can be used in the optical scanning system as a collimator lens. However, in this case, when the wavelength of the laser beam emitted from the laser diode changes, the optical scanning system changes its performance, thereby causing defocus. More specifically, since the Fresnel lens uses diffraction, its focal length changes with a change in the wavelength of the laser beam. The size of a beam spot on an image surface (on a surface of a photosensitive drum) changes according to the focal length of the Fresnel lens. Therefore when the wavelength of the laser beam changes, a finished image will be deteriorated.

The wavelength of the laser beam emitted from the laser diode changes according to the temperature of the laser diode. Main factors of changing the temperature of the laser diode is heat radiated from the light emitting portion of the laser diode itself and a change in temperature in the circumstances. Especially when the laser diode is turned on, the laser diode may be so heated that the wavelength of the laser beam emitted therefrom is changed remarkably.

SUMMARY OF THE INVENTION

An object of the present invention is to provide an image recording apparatus which records quality images.

Another object of the present invention is to provide an image recording apparatus which has a compact laser source unit and brings out stable optical performance regardless of temperature.

A further object of the present invention is to provide an image recording apparatus which has a compact laser source and of which optical performance is not influenced by heat radiated from a laser diode of the laser source unit.

The above objects are intended to be achieved by providing a convergent member having a diffracting effect in the laser source unit in front of a laser diode.

An image recording apparatus according to the present invention has a laser source unit composed of a laser diode and a convergent member having a diffracting effect, and the convergent member has a focal length $f_{co}$ which meets either one of the following conditions.

$$f_{co} > \frac{(4f_H{}^2/\pi D_o{}^2)\Delta\lambda}{\sqrt{(D_1/D_o)^2 - 1}}$$

$$f_{co} > \frac{\{4(b_2/b_1 - L_1)^2 b_1{}^2 \Delta\lambda\}/\pi D_o{}^2}{\sqrt{(D_1/D_o)^2 - 1}}$$

$\Delta\lambda$:$\lambda' - \lambda$ ($\lambda$: wavelength of the laser beam when the laser diode has a standard temperature, $\lambda'$: wavelength of the laser beam when the laser diode has a higher temperature)

$f_{CO}$: focal length of the convergent member when the laser beam has the wavelength $\lambda$ $D_0$: diameter of a beam spot on an image surface when the laser beam has the wavelength $\lambda$ $D_1$: tolerable limit of the diameter of the beam spot $f_H$: focal length of the optical scanning means in a main-scanning direction $b_1$: distance between the convergent member and its image point $b_2$: distance between the optical scanning means and the image surface Another image recording apparatus according to the present invention comprises: a laser source unit composed of a laser diode and a convergent member having a diffracting effect; current supply means for supplying the laser diode with a current, the current being switched between a first level in accordance with a first state of image data and a second level in accordance with a second state of image data; and current control means for adjusting the first level so that the laser diode keeps its output at a specified level and for adjusting the second level so that the first level and the second level have a difference not more than a specified amount.

BRIEF DESCRIPTION OF THE DRAWINGS

These and other objects and features of the present invention will be apparent from the following description in reference with the accompanying drawings in which.

DETAILED DESCRIPTION OF THE PREFERRED EMBODIMENTS

Some exemplary image recording apparatuses according to the present invention are hereinafter described with reference to the accompanying drawings.

First Embodiment: See FIGS. 1–4

Figure 1:
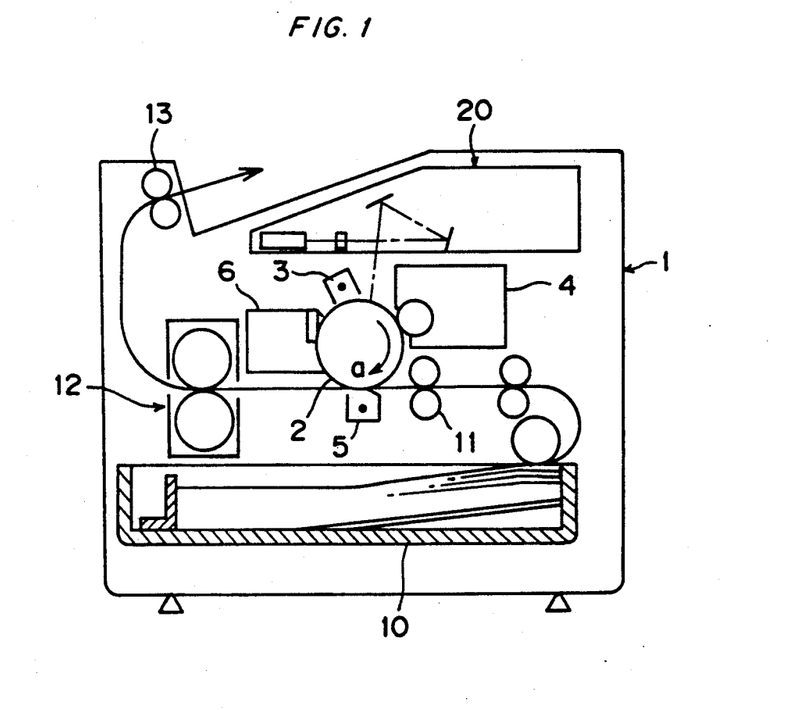
FIG. 1 is a schematic view of a laser printer employing a laser beam optical scanning system which is a first embodiment of the present invention.

FIG. 1 shows a laser printer employing a laser beam optical scanning system 20 which is a first embodiment of the present invention.

A photosensitive drum 2 is disposed substantially in the center of a laser printer body 1 and is rotatable in a direction indicated by arrow a. Around the photosensitive drum 2 are an electric charger 3, a developing device 4, a transfer charger 5 and a residual toner cleaner 6. The laser beam optical scanning system 20 is disposed above the photosensitive drum 2. A laser beam emitted from the optical scanning system 20 irradiates a surface of the photosensitive drum 2, which is electrically charged by the electric charger 3 so as to have a specified potential uniformly, and forms a specified electrostatic latent image thereon. The electrostatic latent image is developed into a toner image by the developing device 4.

Meanwhile, recording sheets are automatically fed one by one from a sheet feed cassette 10 disposed in a lower part of the body 1, and each sheet fed from the cassette 10 is transported to a transfer section via timing rollers 11. The sheet receives the toner image in the transfer section, and the toner image is fixed on the sheet by a fixing device 12. Then, the sheet is ejected onto an upper surface of the body 1 through ejection rollers 13.

Figure 2:
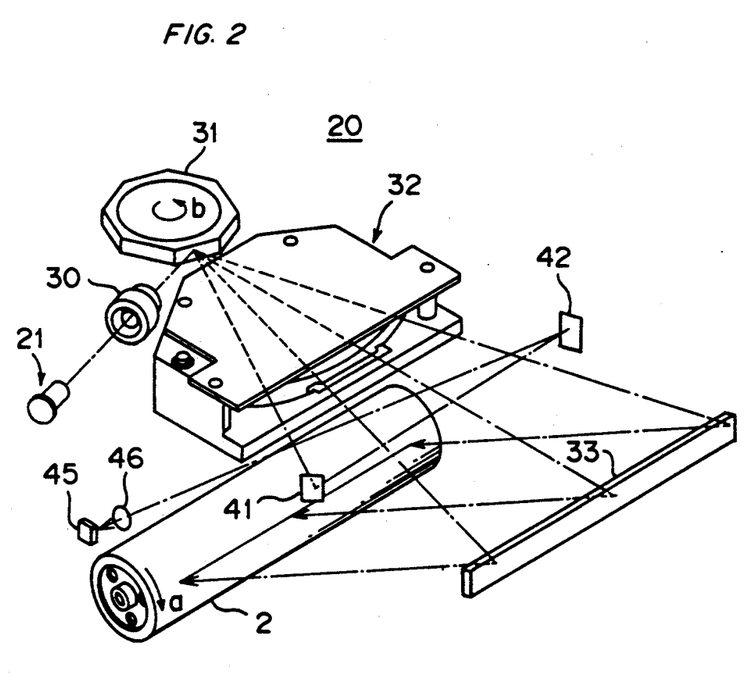
FIG. 2 is a perspective view of the laser beam optical scanning system.

FIG. 2 shows the laser beam optical scanning system 20.

The laser beam optical scanning system 20 comprises a laser source unit 21, a cylindrical lens 30, a polygonal mirror 31, an fθ lens 32, a plane mirror 33, a sensor 45 for timing a start of writing for each scanning line, and mirrors 41 and 42 for guiding a laser beam to the sensor 45, and these elements are fitted in a housing.

A laser beam is emitted from the laser source unit 21 and passes through the cylindrical lens 30 to be imaged on a reflective facet of the polygonal mirror 31. The laser beam is imaged on the facet in a linear form extending in a plane of deflection to be made by the polygonal mirror 31. The polygonal mirror 31 is rotated in a direction indicated by arrow b at a constant speed so as to deflect the laser beam continuously at a constant angular velocity. The deflected laser beam passes through the fθ lens 32 and is reflected by the plane mirror 33. The reflected laser beam proceeds through a slit (not shown) of the housing and is imaged on the photosensitive drum 2. In this way, the laser beam is scanned in a direction parallel with a rotating axis of the photosensitive drum 2 at a constant speed, and scanning in this direction is referred to as main-scanning. Scanning of the laser beam resulting from the rotation of the photosensitive drum 2 is referred to as sub-scanning.

In the above structure, an image (electrostatic latent image) is recorded on the photosensitive drum 2 in accordance with modulation of the laser beam emitted from the laser source unit 21 and the main-scanning and the sub-scanning. The fθ lens 32 adjusts the main-scanning speed so that the scanning speed on a main-scanning line will be constant at every portion. In other words, the fθ lens 32 corrects distortion. The cylindrical lens 30 cooperates with the fθ lens 32 so as to correct errors caused by misalignment of the reflective facets of the polygonal mirror 31.

In the meantime, part of the laser beam deflected by the polygonal mirror 31 is reflected by the mirrors 41 and 42, and enters the sensor 45 via a cylindrical lens 46. Writing for each main-scanning line is started in accordance with a signal sent from the sensor 45.

Figure 3:
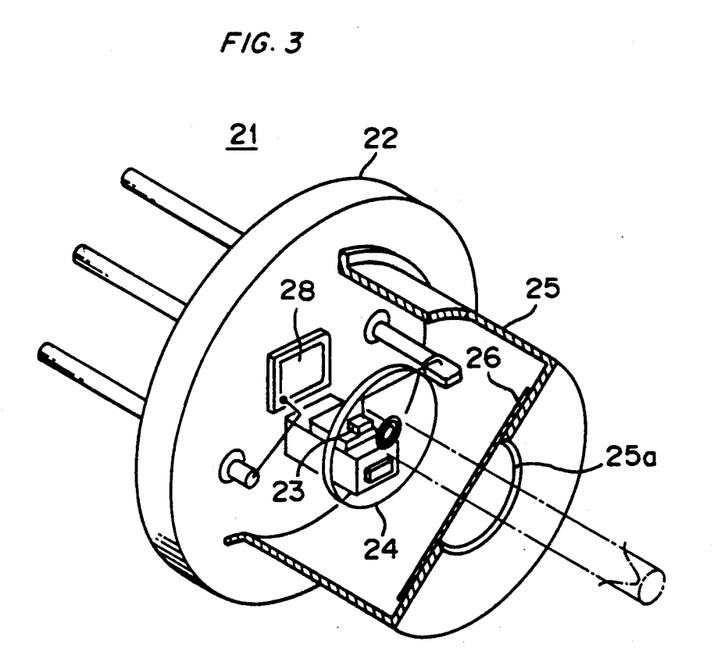
FIG. 3 is a perspective, partially cutaway, view of a laser source unit which is provided in the laser beam optical scanning system.
Figure 4:
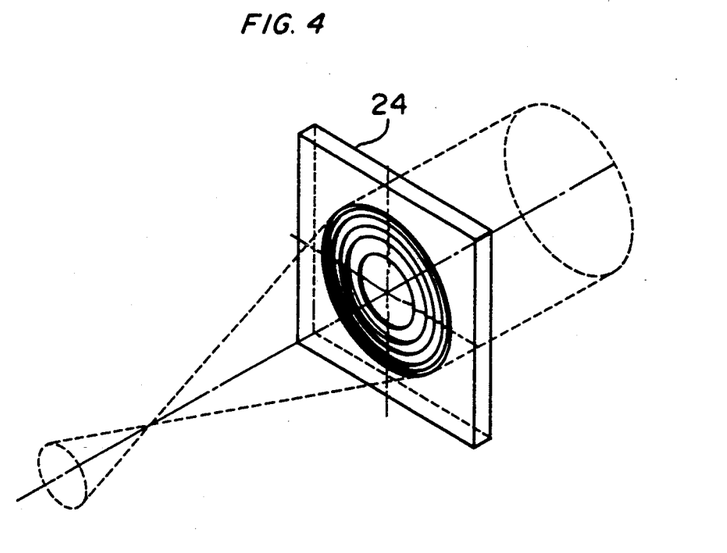
FIG. 4 is a perspective view of a Fresnel lens which is provided in the laser source unit, showing its operation.

Now referring to FIGS. 3 and 4, the laser source unit 21 is described.

The laser source unit 21 comprises a base 22, a laser diode 23, a Fresnel lens 24, a metal cover 25 and a photodiode 28 for monitoring the quantity of light emitted from the laser diode 23. The cover 25 has an exit window 25a provided with a protection glass 26. The laser diode 23 emits a diffused light from its composition plane when it is supplied with a specified amount of electric current. The Fresnel lens 24 has a pattern of concentric circles pitched by microns on a sawtooth surface, and zones among the circles are alternatively transparent and opaque. The Fresnel lens 24 has a refracting effect and a diffracting effect, and a light is bent at the alternatively transparent and opaque zones. When the Fresnel lens 24 receives a parallel pencil of rays, the Fresnel lens 24 changes the parallel pencil of rays into a convergent pencil of rays which converges on its focal point. When the Fresnel lens 24 receives a divergent pencil of rays emitted from its focal point, the Fresnel lens 24 changes the divergent pencil of rays into a parallel pencil of rays (see FIG. 4).

The light emitting portion (composition plane) of the laser diode 23 is disposed on the focal point of the Fresnel lens 24, and therefore the diffused light emitted from the laser diode 23 is changed into a parallel pencil of rays by the Fresnel lens 24. Thus, the parallel pencil of rays proceeds from the laser source unit 21 to the cylindrical lens 30.

The Fresnel lens 24, which is made of polycarbonate, is so made as to handle a laser beam of 780 nm wavelength, and its focal length is about 1–10 mm.

The Fresnel lens 24 is very compact and light, and it can be mounted in a case with the other components of the laser source unit 21 densely. In a conventional laser source unit, a single glass aspherical lens has been used as a collimator lens. Compared with the conventional laser source unit, the laser source unit 21 having the Fresnel lens 24 is very compact. Additionally, since the Fresnel lens 24 is mounted in the case with the other components of the laser source unit 21, positioning of the laser diode 23 and the Fresnel lens 24 is not necessary when mounting the laser source unit 21 in the housing of the optical scanning system 20. Mass production of the Fresnel lens 24 is possible by adopting a molding method, and this method does not require a milling process.

Recently, in order to provide inexpensive laser printers, scanning speed has been tried to be lowered, and sensitivity of photosensitive drums has been tried to be heightened. Specifically, some photosensitive drums require only about 0.2 mW of light to obtain an image thereon. In a case of using such a photosensitive drum, a laser diode must output about 0.8 mW of light because a light transmittance is 25 to 30% in an ordinary optical system. However, 0.8 mW is around a threshold value for a laser diode to perform spontaneous emission and to perform induced emission, and the spontaneous emission of the laser diode is not steadily responsive to image data. It is possible to manufacture a Fresnel lens which has a light transmittance of about 50% or less, and a light transmittance of an optical system employing this Fresnel lens will be lower than that of an ordinary optical system. In this case, accordingly, the laser diode must output much more than 0.8 mW of light, and the laser diode performs the induced emission, which is well responsive to image data.

However, there is still a problem in the laser source unit employing the Fresnel lens. A laser beam emitted from the laser diode changes its wavelength according to temperature. Main factors of changing the temperature of the laser diode is heat radiated from the light emitting portion of the laser diode itself and a change in temperature in the circumstances. Since the Fresnel lens uses diffraction, the Fresnel lens is very susceptible to a change in the wavelength of the laser beam, that is, the Fresnel lens changes its focal length with a change in the wavelength of the laser beam. The change in the focal length of the Fresnel lens is enlarged while the laser beam is passing through downstream optical elements, and therefore a slight change in the focal length of the Fresnel lens may cause remarkable defocus around an image surface (surface of a photosensitive drum).

This problem is hereinafter analyzed.

A change in the focal length of the Fresnel lens with a change in the wavelength of the laser beam emitted from the laser diode can be expressed as follows.

$$f\lambda = f'\lambda' \quad (1)$$

$$f' = (\lambda/\lambda')f \quad (1a)$$

$\lambda$: designed wavelength of the laser beam
$\lambda'$: wavelength of the laser beam after a change
f: designed focal length of the Fresnel lens
f': focal length of the Fresnel lens after the change Defocus resulting from a change in the focal length of the Fresnel lens is expressed by expressions (2) and (3) in respect to the main-scanning direction and the sub-scanning direction respectively.

Main-scanning direction:

$$\Delta X_H = (f_H/f_{CO})^2 \Delta x \quad (2)$$

$\Delta X_H$: degree of defocus (variation in location of a final image point of the optical scanning system)
$\Delta x$: variation in location of an object point of the Fresnel lens
$f_H$: focal length of the optical scanning system
$f_{CO}$: focal length of the Fresnel lens
Sub-scanning direction:

$$\Delta X_V = \beta^2 (f_{CY}/f_{CO})^2 \Delta x \quad (3)$$

$\Delta X_V$: degree of defocus (variation in location of an image point of the optical scanning system)
$\beta$: lateral magnification of the optical scanning system
$f_{CY}$: focal length of the cylindrical lens The size of a beam spot on the photosensitive drum 2 with defocus $\Delta X_H$ can be expressed as follows.

$$D/D_o = \sqrt{1 + (4\lambda \Delta X_H/\pi D_o^2)^2} \quad (4)$$

$D_o$: diameter of the beam spot ($1/e^2$) in the main-scanning direction when the laser beam has a designed wavelength $\lambda$
$D$: diameter of the beam spot ($1/e^2$) when defocus $\Delta X_H$ is caused by a change in the wavelength of the laser beam Although the expression (4) is about the degree of defocus and the size of the beam spot in the main-scanning direction, those in the sub-scanning direction can be expressed in the same way.

The influence of a change in the wavelength $\lambda$ of the laser beam upon the optical scanning system 20 is analyzed, referring to an example having the following design values.

wavelength of the laser beam: $\lambda = 780$ nm
focal length of the Fresnel lens: $f_{CO} = 6$ mm
focal length of the optical scanning system in the main-scanning direction: $f_H = 150$ mm
lateral magnification of the optical scanning system: $\beta = 3$
focal length of the cylindrical lens: $f_{CY} = 4.0$ mm
diameter of a beam spot on the photosensitive drum in the main-scanning direction: 100 μm
diameter of a beam spot on the photosensitive drum in the sub-scanning direction: 150 μm Table 1 shows variations with changes in the wavelength of the laser beam.

TABLE 1

| variation in the wavelength | Δ X | Δ X$_H$ | Δ X$_V$ | D$_H$ | D$_V$ |
| --- | --- | --- | --- | --- | --- |
| 1 nm | 7.7 μm | 4.8 mm | 3.1 mm | 111 μm | 151 μm |
| 2 nm | 15.4 μm | 9.6 mm | 6.2 mm | 188 μm | 155 μm |

$D_H$: diameter of the beam spot ($1/e^2$) in the main-scanning direction with a variation in the wavelength of the laser beam
$D_V$: diameter of the beam spot ($1/e^2$) in the sub-scanning direction with a variation in the wavelength of the laser beam As is apparent from Table 1, a change in the wavelength of the laser beam influences the main-scanning more strongly than the sub-scanning. A change in the wavelength of the laser beam leads to an enlargement of the beam spot on the photosensitive drum. The enlargement of the beam spot lowers the energy density on the photosensitive drum, and this results in thinner lines and a low density on a finished image through electrophotographic processing. Two ways of preventing these problems are possible. One is inhibiting the wavelength of the laser beam from varying, and the other is inhibiting a change in the wavelength of the laser beam from causing defocus (a change in the location of the final image point) of the optical scanning system.

In the first embodiment, a Fresnel lens which has a desired focal length is used so that a change in the wavelength with a rise in the temperature of the laser diode will not cause such serious defocus as to cause practical problems. Since a change in the wavelength of the laser beam influences the main-scanning more strongly than the sub-scanning, the Fresnel lens should be so designed as to inhibit defocus especially in respect to the main-scanning direction.

If the beam spot on the photosensitive drum 2 is tolerated to be enlarged to have a diameter $D_1$ in the main-scanning direction ($D < D_1$), a condition thereof can be expressed as follows.

$$\sqrt{1 + (4\lambda \Delta X_H / \pi D_o^2)^2} < D_1/D_o \tag{4a}$$

A variation $\Delta x$ in the location of the object point of the Fresnel lens when the wavelength of the laser beam changes from $\lambda$ to $\lambda'$ is expressed as follows.

$$\Delta x = \{(\lambda' - \lambda)/\lambda\} f_{CO} \tag{5}$$

By substituting the expression (5) into the expression (2), an expression (2a) is obtained.

$$\Delta X_H = \{(f_H/f_{CO})^2 (\lambda' - \lambda)/\lambda\} f_{CO} \tag{2a}$$

By substituting the expression (2a) into the expression (4a), an expression (6) is obtained.

$$f_{co} > \frac{(4f_H^2/\pi D_o^2)\Delta\lambda}{\sqrt{(D_1/D_o)^2 - 1}} \tag{6}$$

$$\Delta\lambda = \lambda' - \lambda$$

A Fresnel lens which has a focal length $f_{co}$ larger than a value calculated by the right term of the expression (6) must be used. However, if the focal length $f_{co}$ of the Fresnel lens is too large, light transmittance of the optical system as a whole becomes too low. In that case, in order to compensate the low light transmittance, a large current must be supplied to the laser diode, which may help the wavelength of the laser beam vary. Therefore the focal length $f_{co}$ of the Fresnel lens must be large enough to meet the expression (6) but not so large as to cause the problem. Further, the limit $D_1$ of the diameter of the beam spot is practically about 1.25 times the design value $D_o$.

More specifically, a variation $\Delta\lambda$ in the wavelength of the laser beam can be kept about less than 1 nm under the present technology, and if the diameter of the beam spot is tolerated to increase by at most 25% ($D_1/D_o < 1.25$), an expression (6) can be rewritten as follows.

$$f_{co} > \frac{4 \times 10^{-6} f_H^2 / \pi D_o^2}{\sqrt{1.25^2 - 1}} \tag{6a}$$

$$> \frac{5.3 \times 10^{-6} f_H^2}{\pi D_o^2}$$

The design value $D_o$ of the beam spot is determined depending on what image density is desired and is calculated as follows.

$$D_o/P \leq 2.0 \tag{7}$$

P: image pitch

240 DPI = 0.106
300 DPI = 0.085
400 DPI = 0.0635

The expressions (6a) and (7) determine the relation between the focal length $f_{co}$ of the Fresnel lens and the focal length $f_H$ of the optical scanning system in the main-scanning direction. If P = 400 DPI and $D_o = 1.7$ P(0.10795), the relation between $f_{co}$ and $f_H$ is as follows.

$$f_{co} > 1.45 \times 10^{-4} f_H^2 \tag{8}$$

If P = 300 DPI and $D_o = 1.7$ P, the relation between $f_{co}$ and $f_H$ is as follows.

$$f_{co} > 8.08 \times 10^{-5} f_H^2 \tag{9}$$

If P = 240 DPI and $D_o = 1.7$ P, the relation between $f_{co}$ and $f_H$ is as follows.

$$f_{co} > 5.2 \times 10^{-5} f_H^2 \tag{10}$$

If an optical scanning system having a focal length $f_H$ of 170 mm is employed in a printer of 400 DPI, a Fresnel lens which has a focal length $f_{co}$ larger than, preferably a little larger than 4.2 (calculated by using the expression (8)) must be used in the optical scanning system.

The above analysis can be applied only to a case wherein the light emitting portion of the laser diode 23 is disposed on the focal point of the Fresnel lens 24 and a parallel pencil of rays is emitted from the laser source unit 21.

If the light emitting portion of the laser diode 23 is farther than the focal point of the Fresnel lens 24, a convergent pencil of rays is emitted from the laser source unit 21. In this case, the expression (6) cannot be used to determine the focal length $f_{co}$ of the Fresnel lens 24. If an $f\theta$ mirror system is disposed after the polygonal mirror 31 instead of the $f\theta$ lens system 32, the expression (6) cannot be used to determine the focal length $f_{co}$ of the Fresnel lens 24.

Second Embodiment: See FIGS. 5–7

Figure 5:
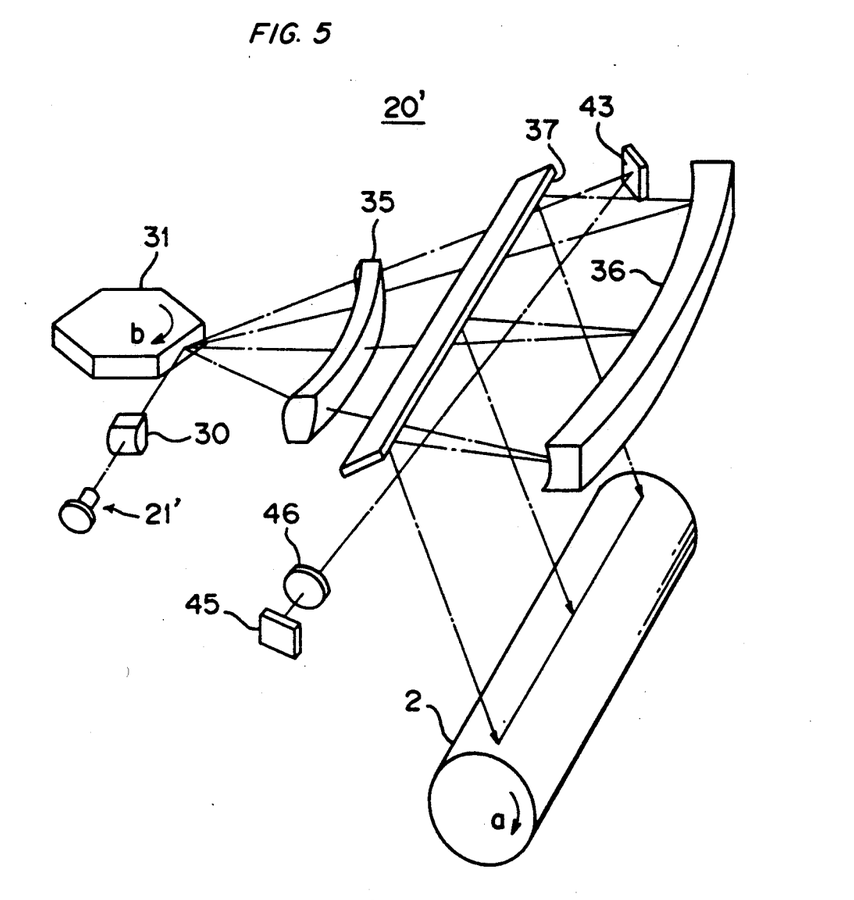
FIG. 5 is a perspective view of a laser beam optical scanning system which is a second embodiment.

A second embodiment of the present invention is a laser beam optical scanning system 20' which has a laser source unit 21' emitting a convergent pencil of rays and has an $f\theta$ mirror system. The laser source unit 21' comprises the same components as the laser source unit 21 in the first embodiment.

FIG. 5 shows the optical scanning system 20'. The polygonal mirror 31 deflects a laser beam emitted from the laser source unit 21', and the deflected laser beam passes through a toric lens 35 and is reflected by a spherical mirror 36 and a plane mirror 37. Then, the laser beam is imaged on a surface of the photosensitive drum 2. Meanwhile, part of the deflected laser beam is reflected by a mirror 43 and guided to the sensor 45.

A toric lens means a lens which has a toroidal surface and a spherical, plane or cylindrical surface, one of which surfaces serves as an incidence side and the other of which serves as an emergence side. In the second embodiment, the toric lens 35 has a toroidal surface as the incidence side and a spherical surface as the emergence side. A toroidal surface means a surface of which principal meridians have mutually different centers of curvature.

The spherical mirror 36 and the spherical surface of the toric lens 35 function as an $f\theta$ lens. Specifically, the spherical mirror 36 and the spherical surface of the toric lens 35 adjust the main-scanning speed to prevent distortion and prevent curvature of field in the main-scanning direction. The toroidal surface of the toric lens 35 corrects errors caused by misalignment of the reflective facets of the polygonal mirror 31 and prevents curvature of field in the sub-scanning direction. The cylindrical lens 30 images the laser beam emitted from the laser source unit 21' on a reflective facet of the polygonal mirror 31. The toroidal surface of the toric lens 35 keeps each reflective facet of the polygonal mirror 31 and the surface of the photosensitive drum to conjugate each other.

Next, defocus of the optical scanning system 20' is analyzed.

Figure 6:
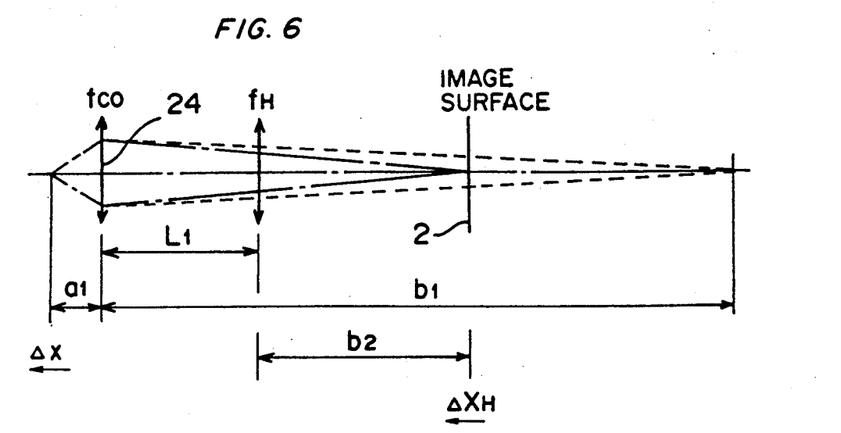
FIG. 6 is a view showing the progression of a laser beam in a main-scanning direction in the laser beam optical scanning system of the second embodiment.

FIG. 6 shows progression of the laser beam in respect to the main-scanning direction. In FIG. 6, marks $a_1$, $b_1$, $L_1$ and $b_2$ denote the following things.

$a_1$: distance between the Fresnel lens and its object point $b_1$: distance between the Fresnel lens and its image point $L_1$: distance between the Fresnel lens and the toric lens $b_2$: distance between the toric lens and the photosensitive drum The degree of defocus $\Delta X_H$ (a variation in location of a final image point of the optical scanning system 21') in the main-scanning direction can be expressed as follows.

$$\Delta X_H = \left(\frac{b_2}{b_1 - L_1}\right)^2 \left(1 - \frac{b_1}{a_1}\right)^2 \Delta f_{co} \quad (2b)$$

$\Delta f_{co}$: variation in the focal length of the Fresnel lens

For example, when $a_1 = 6$ mm, $b_1 = 600$ mm, $L_1 = 200$ mm and $b_2 = 150$ mm, $\Delta X_H$ is calculated at 1378.3 $\Delta f_{co}$.

Figure 7:
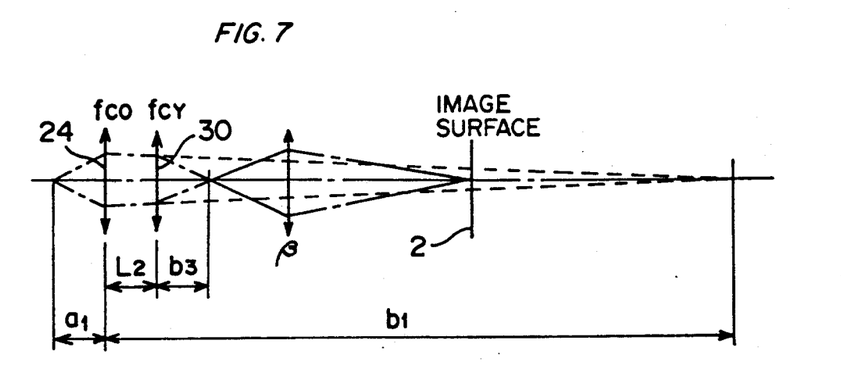
FIG. 7 is a view showing the progression of the laser beam in a sub-scanning direction in the laser beam optical scanning system of the second embodiment.

FIG. 7 shows progression of the laser beam in respect to the sub-scanning direction. Marks $L_2$, $b_3$ and $\beta$ denote the following things.

$L_2$: distance between the Fresnel lens and the cylindrical lens $b_3$: distance between the cylindrical lens and its image point $\beta$: lateral magnification of the optical scanning system in the sub-scanning direction The degree of defocus $\Delta X_v$ (variation in the location of the final image point of the optical scanning system 21') in the sub-scanning direction can be expressed as follows.

$$\Delta X_V = \beta^2 \left(\frac{b_3}{b_1 - L_2}\right)^2 \left(1 - \frac{b_1}{a_1}\right)^2 \Delta f_{co} \quad (3b)$$

For example, when $a_1 = 6$ mm, $b_1 = 600$ mm, $L_2 = 50$ mm, $b_3 = 50$ mm and $\beta = 2$, $\Delta X_v$ is calculated at 729 $\Delta f_{co}$.

The beam spot on the photosensitive drum 2 is enlarged with the defocus. The diameter $D_H$ of the enlarged beam spot ($1/e^2$) in the main-scanning direction and the diameter $D_v$ of the enlarged beam spot ($1/e^2$) in the sub-scanning direction are expressed by expressions (11) and (12) respectively under conditions of $\lambda/\lambda' \approx 1$, $a_1 < b_1$ and $a_1 \approx f_{co}$.

$$D_H = \frac{b_2}{(b_1 - L_2)} \cdot \frac{4\pi b_1}{\pi 2 a_1 \sin(1.7\theta_H/2)} \cdot \Delta D_H \quad (11)$$

under a condition of $$D_V = \beta \left(\frac{b_3}{b_1 - L_1}\right) \cdot \frac{4\pi b_1}{\pi 2 a_1 \sin(1.7\theta_v/2)} \cdot \Delta D_V \quad (12)$$

under a condition of $$\frac{1}{b_3} - \frac{1}{b_1 - L_1} = \frac{1}{f_{CY}}$$

$\theta_H$: angle of diffusion of the laser beam in the main-scanning direction $\theta_v$: angle of diffusion of the laser beam in the sub-scanning direction $\Delta D_H$: coefficient calculated from $\theta_H$ and N.A. of the Fresnel lens $\Delta D_v$: coefficient calculated from $\theta_v$ and N.A. of the Fresnel lens The degree of defocus in the main-scanning direction can be calculated as indicated by the expression (2b). The relation between the degree of defocus and the beam spot can be expressed by the expression (4) mentioned in the first embodiment. As described in the first embodiment, if the beam spot is tolerated to be enlarged to have a diameter $D_1$ in the main-scanning direction, an expression (13) can be obtained from the expressions (4a) and (2b).

$$f_{co} > \frac{\{4(b_2/b_1 - L_1)^2 b_1{}^2 \Delta\lambda\}/\pi D_o{}^2}{\sqrt{(D_1/D_o)^2 - 1}} \quad (13)$$

In the second embodiment, a Fresnel lens having a focal length $f_{co}$ which meets the condition indicated by the expression (13) must be used.

As mentioned in the first embodiment, the limit $D_1$ of the diameter of the beam spot is about 1.25 times the design value $D_o$, and a variation $\Delta\lambda$ in the wavelength of the laser beam can be kept less than 1 nm. Accordingly, the expression (13) can be rewritten as follows.

$$f_{co} > \frac{5.3 \times 10^{-6}}{\pi D_o{}^2} b_2{}^2 \left(\frac{a_1 - b_1}{b_1 - L_1}\right)^2 \quad (13a)$$

$$> \frac{5.3 \times 10^{-6}}{\pi D_o{}^2} b_2{}^2 \left(\frac{b_1}{b_1 - L_1}\right)^2$$

If $b_1 = 600$ mm, $L_1 = 200$ mm and $b_2 = 110$ mm, a Fresnel lens which has a focal length $f_{co}$ larger than 3.9 must be used.

Third Embodiment: See FIGS. 8–11

In a third embodiment, variation in the focal length of the Fresnel lens, which causes defocus, is intended to be inhibited by controlling the current supplied to the laser diode. The third embodiment comprises the same components as the optical scanning system 20 of the first embodiment shown in FIGS. 1–4. As described in the first embodiment, the wavelength of the laser beam emitted from the laser diode changes according to the temperature of the laser diode, and main factors of changing the temperature of the laser diode is heat radiated from the laser diode itself and a change in temperature in the circumstances. The Fresnel lens which uses diffraction changes its focal length according to the wavelength of the laser beam. A slight change in the focal length of the Fresnel lens is enlarged while the laser beam is passing through the downstream optical elements 30, 31, 32 and 33, and this may result in remarkable defocus.

The analysis of this problem can be made in the same manner as that in the first embodiment using the expressions (1), (1a), (2) and (3). The expression (4) which shows the relation between the degree of defocus and the diameter of the beam spot and Table 1 which shows the relation between the wavelength of the laser beam and the diameter of the beam spot can be used for the analysis of the third embodiment. Further, the expression (6) determining the focal length $f_{co}$ of the Fresnel lens can be used in the third embodiment.

In the third embodiment, the wavelength of the laser beam emitted from the laser diode is intended to vary only within a narrow range by controlling the current supplied to the laser diode. In this way, variation in the focal length of the Fresnel lens will be inhibited, and defocus will be reduced to such a low degree as not to cause practical problems. As is apparent from Table 1, a change in the wavelength of the laser beam influences the main-scanning more strongly than the sub-scanning, and therefore inhibition of defocus especially in the main-scanning direction should be considered.

In the third embodiment, the wavelength of the laser beam is intended to vary within a narrow range. From the expression (6), an expression (6a) determining a variation $\Delta\lambda$ in the wavelength of the laser beam can be obtained.

$$\Delta\lambda < \frac{f_{co}\sqrt{(D_1/D_0)^2 - 1}}{4f_H^2/\pi D_o^2} \quad (6b)$$

The current supplied to the laser diode must be so controlled that the wavelength of the laser beam varies within a range expressed by the right term of the expression (6b). Practically, the tolerable limit $D_1$ of the diameter of the beam spot is about 1.25 times the design value $D_0$.

Next, control of the current supplied to the laser diode is hereinafter described.

Figure 8:
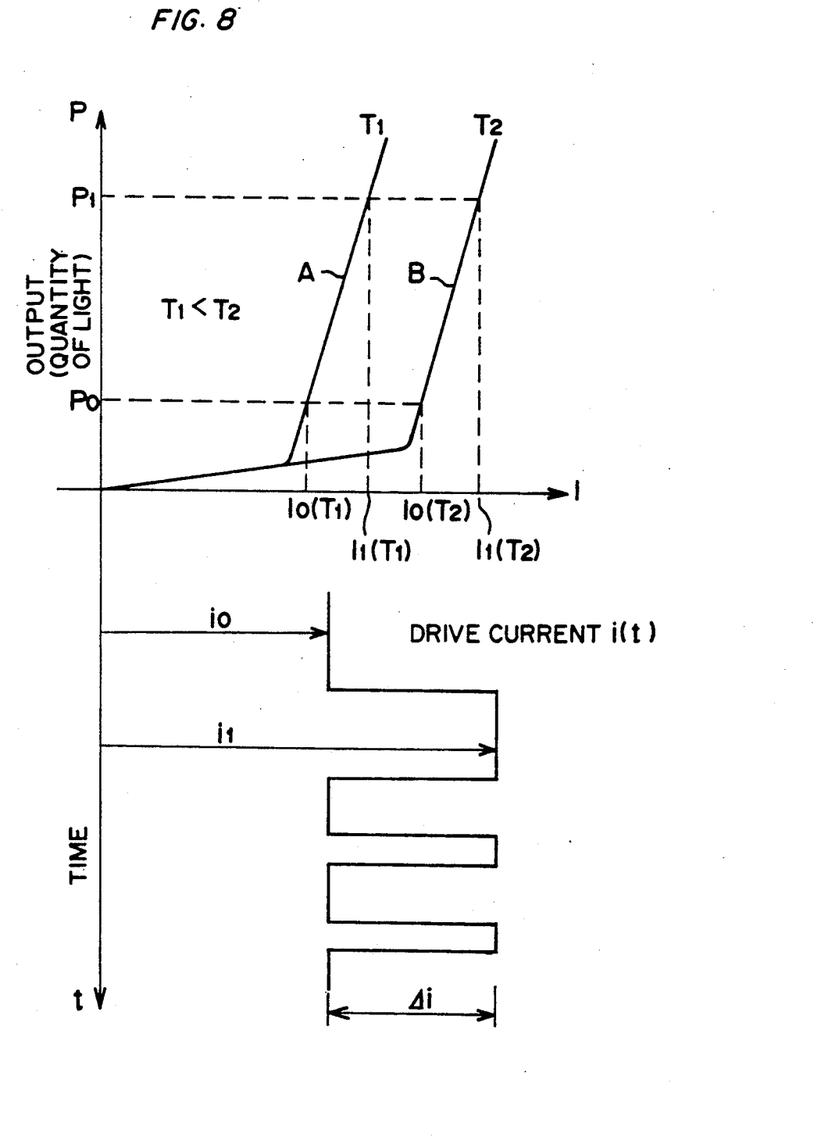
FIG. 8 is a chart showing relation between a driving current of a laser diode and its output according to a third embodiment.

FIG. 8 shows the relation between the amount of current I supplied to the laser diode and the output (quantity of light) P of the laser diode. The lines A and B indicate output characteristics of the laser diode under a temperature of $T_1$ and under a temperature of $T_2$ respectively. The temperature $T_1$ is lower than the temperature $T_2$. A value $P_0$ is a threshold value of development. As long as the quantity of light emitted from the laser diode is not more than $P_0$, the data on the light will never be developed. On the other hand, in order to obtain an image of a desired density, for example, ID=1.5, the quantity of light emitted from the laser diode must be at least a value $P_1$.

According to the characteristic curves A and B, when the temperature rises, the quantity of light emitted from the laser diode becomes smaller. Therefore in order to enable the laser diode to emit the same quantity of light under a higher temperature, the laser diode must be supplied with more current. Specifically, when the temperature rises from $T_1$ to $T_2$, the current must be increased from $I_1(T_1)$ to $I_1(T_2)$ in order to obtain an image of the desired density. Thus, the current supplied to the laser diode must be controlled so that outputs of the laser diode in accordance with image data of "0" and in accordance with image data of "1" will be not more than $P_0$ and at least $P_1$ respectively under any temperature. This can be expressed as follows.

$$i_0 \leq I_0(T) \quad (20)$$

$$i_1 \geq I_1(T) \quad (21)$$

$i_0$: amount of current supplied to the laser diode in accordance with image data of "0"

$i_1$: amount of current supplied to the laser diode in accordance with image data of "1"

The expression (20) indicates a condition of preventing unnecessary toner deposition on an image, and the expression (21) indicates a condition of forming an image of a desired density.

If an optical scanning system of a printer employs an ordinary collimator lens, not a Fresnel lens, only the conditions (20) and (21) must be considered. However, if the optical system employs a Fresnel lens which uses diffraction, the wavelength of the laser beam must be substantially stabilized while the laser diode is operating to record a series of image data. In order to do that, preferably, the difference of a heating value of the laser diode when it is provided with image data of "0" and a heating value of the laser diode when it is provided with image data of "1" is small. Accordingly, it is preferred that the current difference $\Delta i$ ($i_1 - i_0$) is small.

It is known that the wavelength $\lambda$ of a laser beam emitted from a laser diode changes in proportion to a change in the temperature T of the laser diode, and this can be expressed as follows.

$$\Delta\lambda/\Delta T = k \quad (22)$$

$\Delta T$: variation in the temperature of the laser diode k: constant which is peculiar to the laser diode The relation among the temperature T of the laser diode, the temperature $T_a$ in the circumstances and the output P of the laser diode is expressed as follows.

$$T = R_{th}P + T_a \quad (23)$$

$R_{th}$: thermal resistance

The expression (23) can be rewritten as follows by using a voltage v (fixed) and the current i supplied to the laser diode.

$$T = R_{th}Vi + T_a \quad (24)$$

$$\Delta T = R_{th}V\Delta i \quad (25)$$

From the expressions (6b), (22) and (25), an expression (26) can be obtained.

$$\Delta i < \frac{1}{kR_{th}V} \cdot \frac{f_{co}\sqrt{(D_1/D_0)^2 - 1}}{4f_H^2/\pi D_o^2} \quad (26)$$

In order to keep the diameter D of the beam spot within a specified tolerable range, the amounts $i_1$ and $i_0$ of the current must be set such that the difference $\Delta i$ ($i_1-i_0$) meets the condition indicated by the expression (26).

Now, exemplary design values of the third embodiment are presented.

$D_1/D_0=1.2$
$D_0=0.108$ mm(300DPI)
$f_H=160$ mm
$f_{co}=5$ mm
$R_{th}=0.07°$ C./mW (ordinarily $0.05°-0.1°$ C./mW)
$v=2.0$ V (ordinarily 1.8-2.5 V)
$k=0.3$ nm/$°$ C. (ordinarily 0.4 nm/$°$ C., DFB0.07 nm/$°$ C.)

If the optical scanning system 20 is made according to the above design values, the current can be controlled so that $\Delta i$ ($=i_1-i_0$) will be smaller than 29 mA.

Figure 9:
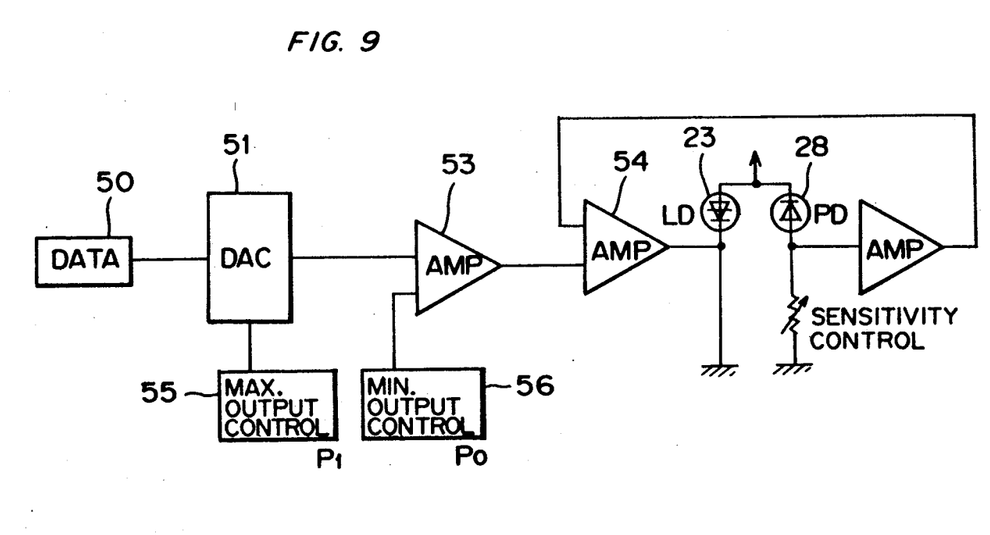
FIG. 9 is a block diagram of a driving current control circuit according to the third embodiment.

FIG. 9 shows an exemplary circuit for controlling the current supplied to the laser diode.

The control circuit contains a continuous feedback loop using the photodiode 28 disposed in the laser source unit 21. In the circuit, the current is varied to have the laser diode 23 emit a proper amount of light for each dot. Image data sent from a data processor 50 enters a D/A converter 51, and an output of the D/A converter 51 passes through amplifiers 53 and 54 and is used to control the current supplied to the laser diode 23. In a circuit 55, the current is set to a level to have the laser diode 23 achieve the larger output value $P_1$, and an output of the circuit 55 is inputted into the D/A converter 51. In a circuit 56, the current is set to a level to have the laser diode 23 achieve the smaller output $P_0$, and an output of the circuit 56 is inputted into the amplifier 53. In this way, the current supplied to the laser diode 23 is controlled in accordance with image data for each dot.

Figure 10:
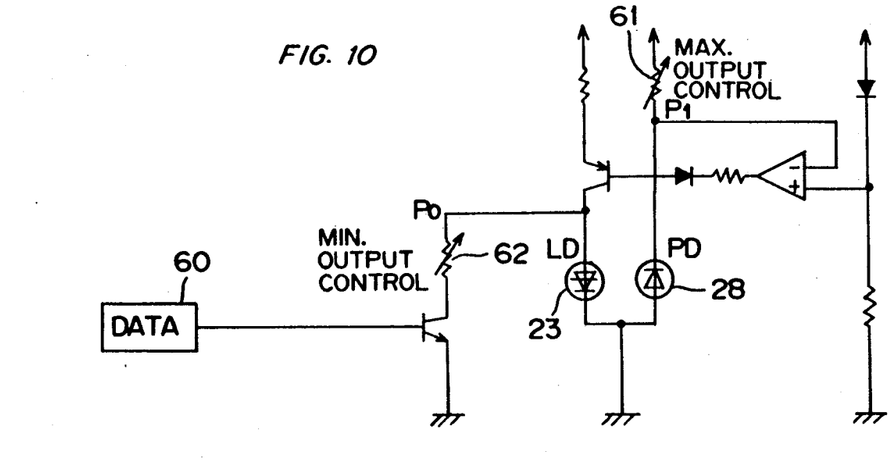
FIG. 10 is a block diagram of another driving current control circuit according to the third embodiment.

FIG. 10 shows another exemplary circuit for controlling the current supplied to the laser diode.

In the circuit, the current is controlled in accordance with two-value image data sent from a data processor 60. The output of the laser diode 23 is detected by the photodiode 28. When image data of "1" are sent from the data processor 60 (the laser diode 23 must write an image), the laser diode 23 must achieve the larger output value $P_1$, and a valuable resistor 61 varies its resistance such that the laser diode 23 is supplied with a current $i_1$ to have the laser diode 23 achieve the larger output value $P_1$. When image data of "0" are sent from the data processor 60 (the laser diode 23 must not write an image), the current flows not only to the laser diode 23 but also to a valuable resistor 62 which is connected in parallel with the laser diode 23. The resistor 62 varies its resistance such that the laser diode 23 is supplied with only a bias current $i_0$ to have the laser diode 23 achieve the smaller output value $P_0$.

Figure 11:
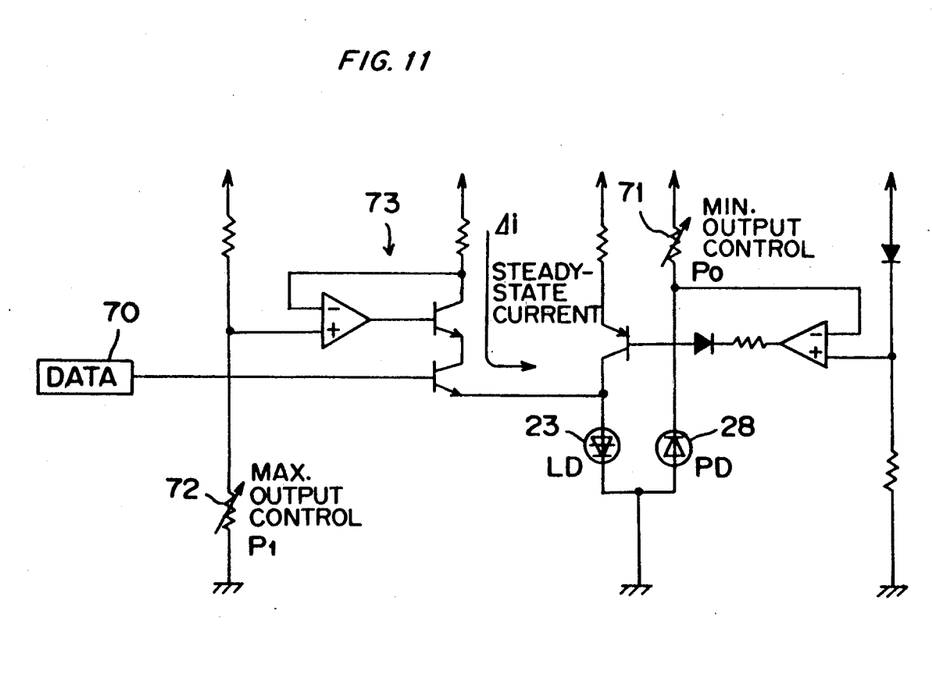
FIG. 11 is a block diagram of another driving current control circuit according to the third embodiment.

FIG. 11 shows another exemplary circuit for controlling the current supplied to the laser diode 23.

The output of the laser diode 23 is detected by the photodiode 28. While the laser diode 23 is in a waiting condition (not writing), a valuable resistor 71 varies its resistance such that the laser diode 23 can achieve the smaller output value $P_0$. This control circuit is provided with a steady-state current generating section 73 for superimposing the laser diode 23 with a current $\Delta i$ ($|i_1-i_0|$). When image data of "1" are sent from a data processor 70, the steady-state current is supplied to the laser diode 23 from the section 73. The output of the laser diode 23 superimposed with the current is detected by the photodiode 28, and by varying the resistance of a resistor 72, the current from the section 73 is minutely controlled such that the laser diode 23 can achieve the larger output value $P_1$. As is apparent from the graph of FIG. 8, the output of the laser diode 23 shows substantially the same characteristic under any temperature, that is, the slope of the output characteristic lines A and B under temperatures $T_1$ and $T_2$ are substantially the same. Therefore, this structure can be used for the current control circuit.

Further, the analysis described in the third embodiment can be applied only to a case wherein the light emitting portion of the laser diode 23 is disposed on the focal point of the Fresnel lens 24 and the laser source unit 21 emits a parallel pencil of rays.

If the light emitting portion of the laser diode 23 is disposed farther than the focal point of the Fresnel lens 24, the laser source unit 21 emits a convergent pencil of rays. In this case, the expressions (6) and (6b) cannot be used. Further, if an $f\theta$ mirror system is disposed after the polygonal mirror 31 instead of the $f\theta$ lens system 32, the expressions (6) and (6b) cannot be used.

Fourth Embodiment

A fourth embodiment comprises the same components of the second embodiment shown in FIG. 5. The laser beam optical scanning system 20' has the laser source unit 21' which emits a convergent pencil of rays and the $f\theta$ mirror system. In the fourth embodiment, the current supplied to the laser diode 23 is controlled in the same manner as in the third embodiment.

The relation between defocus and the beam spot can be analyzed in the same manner as in the second embodiment, and the expressions (2b), (3b), (11) and (12) can be used.

The degree of defocus in the main-scanning direction (a variation $\Delta X_H$ in the location of the final image point in the main-scanning direction) can be calculated as indicated by the expression (2b), and the relation between the degree of defocus $\Delta X_H$ and the beam spot can be expressed by the expression (4). If the beam spot is tolerated to be enlarged to have a diameter $D_1$ in the main-scanning direction, an expression (13) can be obtained from the expressions (4a) and (2b). The expression (13) can be rewritten as follows.

$$\Delta \lambda < \frac{f_{co}\sqrt{(D_1/D_0)^2 - 1}}{4(b_2/b_1 - L_1)^2 b_1^2/\pi D_o^2} \tag{13b}$$

In the fourth embodiment, the current supplied to the laser diode 23 is controlled such that a variation $\Delta\lambda$ in the wavelength of the laser beam emitted from the laser diode 23 meets the condition above. Practically, the tolerable limit $D_1$ of the diameter of the beam spot is 1.25 times the design value $D_0$.

The relation between the current supplied to the laser diode 23 and the beam spot can be analyzed in the same manner as that in the third embodiment. By substituting the expressions (22) and (25) mentioned in the third embodiment into the expression (13b), an expression (31) can be obtained.

$$\Delta i < \frac{1}{kR_{th}V} \cdot \frac{f_{co}\sqrt{(D_1/D_0)^2 - 1}}{4(b_2/b_1 - L_1)^2 b_1^2/\pi D_o^2} \tag{31}$$

In order to keep the diameter D of the beam spot within the tolerable range (smaller than $D_1$), the current must be controlled so as to meet the condition indicated by the expression (31).

Other Embodiments

Although the present invention has been described in connection with the embodiments above, it is to be noted that various changes and modifications are possible to those who are skilled in the art. Such changes and modifications are to be understood as being within the scope of the present invention.

For example, it is possible to use a laser source unit emitting a parallel pencil of rays and an $f\theta$ mirror system for an optical scanning system.

What is claimed is:

1. An image recording apparatus comprising:
   a laser diode for emitting a laser beam in accordance with image data;
   a convergent member having a diffraction effect for collimating the laser beam, the convergent member being disposed in front of the laser diode; and
   optical scanning means for scanning the laser beam which passed through the convergent member on an image surface;
   wherein the image recording apparatus meets a condition expressed by an expression $$f_{co} > \frac{(4f_H^2/\pi D_o^2)\Delta\lambda}{\sqrt{(D_1/D_o)^2 - 1}}$$

in which expression, $\Delta\lambda$ denotes a variation in wavelength of the laser beam from a designed wavelength $\lambda$ with a rise in temperature of the laser diode from a standard temperature;
   $f_{co}$ denotes a focal length of the convergent member when the laser beam has the wavelength $\lambda$;
   $D_0$ denotes a diameter of a beam spot on the image surface when the laser beam has the wavelength $\lambda$;
   $D_1$ denotes a tolerable limit of the diameter of the beam spot; and
   $f_H$ denotes a focal length of the optical scanning means in a main-scanning direction.

2. An image recording apparatus as claimed in claim 1, wherein the laser diode and the convergent member are assembled into a unit.

3. An image recording apparatus as claimed in claim 1, wherein the convergent member is a micro Fresnel lens which has a pattern of concentric circles pitched by microns on a sawtooth surface.

4. An image recording apparatus as claimed in claim 1, wherein the convergent member is made of resin.

5. An image recording apparatus as claimed in claim 1, wherein the optical scanning means comprises a polygonal mirror and an $f\theta$ optical system.

6. An image recording apparatus comprising:
   a laser diode for emitting a laser beam in accordance with image data;
   a convergent member having a diffraction effect for converging the laser beam into a convergent pencil of rays, the convergent member being disposed in front of the laser diode; and
   optical scanning means for scanning the laser beam which passed through the convergent member on an image surface;
   wherein the image recording apparatus meets a condition expressed by an expression $$f_{co} > \frac{\{4(b_2/b_1 - L_1)^2 b_1^2 \Delta\lambda\}/\pi D_o^2}{\sqrt{(D_1/D_o)^2 - 1}}$$

in which expression, $\Delta\lambda$ denotes a variation in wavelength of the laser beam from a designed wavelength $\lambda$ with a rise in temperature of the laser diode from a standard temperature;
   $f_{co}$ denotes a focal length of the convergent member when the laser beam has the wavelength $\lambda$;
   $D_0$ denotes a diameter of a beam spot on the image surface when the laser beam has the wavelength $\lambda$;
   $D_1$ denotes a tolerable limit of the diameter of the beam spot;
   $b_1$ denotes a distance between the convergent member and its image point; and
   $b_2$ denotes a distance between the optical scanning means and the image surface.

7. An image recording apparatus as claimed in claim 6, wherein the laser diode and the convergent member are assembled into a unit.

8. An image recording apparatus as claimed in claim 6, wherein the convergent member is a micro Fresnel lens which has a pattern of concentric circles pitched by microns on a sawtooth surface.

9. An image recording apparatus as claimed in claim 6, wherein the convergent member is made of resin.

10. An image recording apparatus as claimed in claim 6, wherein the optical scanning means comprises a polygonal mirror and an $f\theta$ optical system.

11. An image recording apparatus comprising:
    a laser diode for emitting a laser beam in accordance with image data;
    a convergent member having a diffraction effect for converging the laser beam, the convergent member being disposed in front of the laser diode;
    optical scanning means for scanning the laser beam which passed through the convergent member on an image surface;
    current supply means for supplying the laser diode with a current, the current being switched between a first level in accordance with a first state of image data and a second level in accordance with a second state of image data; and
    current control means for adjusting the first level of the current so that the laser diode keeps its output at a specified level;
    wherein the first level and the second level of the current are determined such that the laser beam varies its wavelength only within a specified range while the laser diode is supplied with the current switched between the first level and the second level.

12. An image recording apparatus as claimed in claim 11, wherein the current control means controls the current supply means so that the first level and the second level have a difference not more than a specified amount.

13. An image recording apparatus as claimed in claim 11, wherein the laser diode and the convergent member are assembled into a unit.

14. An image recording apparatus as claimed in claim 11, wherein the convergent member is a micro Fresnel lens which has a pattern of concentric circles pitched by microns on a sawtooth surface.

15. An image recording apparatus as claimed in claim 11, wherein the convergent member is made of resin.

16. An image recording apparatus comprising:
a laser diode for emitting a laser beam in accordance with image data;
a convergent member having a diffraction effect for converging the laser beam, the convergent member being disposed in front of the laser diode;
optical scanning means for scanning the laser beam which passed through the convergent member on an image surface;
current supply means for supplying the laser diode with a current, the current being switched between a first level in accordance with a first state of image data and a second level in accordance with a second state of image data; and
current control means for adjusting the first level so that the laser diode keeps its output at a specified level and for adjusting the second level so that the first level and the second level has a difference not more than a specified amount.

17. An image recording apparatus as claimed in claim 16, wherein the laser diode and the convergent member are assembled into a unit.

18. An image recording apparatus as claimed in claim 16, wherein the convergent member is a micro Fresnel lens which has a pattern of concentric circles pitched by microns on a sawtooth surface.

19. An image recording apparatus as claimed in claim 16, wherein the convergent member is made of resin.

* * * * *